(12) United States Patent
Douglas

(10) Patent No.: US 11,810,128 B2
(45) Date of Patent: Nov. 7, 2023

(54) SYSTEMS AND METHODS FOR CUSTOMER SERVICE PREDICTION

(71) Applicant: Capital One Services, LLC, McLean, VA (US)

(72) Inventor: Lawrence Douglas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/964,683

(22) Filed: Oct. 12, 2022

(65) Prior Publication Data

US 2023/0030609 A1 Feb. 2, 2023

Related U.S. Application Data

(63) Continuation of application No. 16/112,625, filed on Aug. 24, 2018, now abandoned.

(51) Int. Cl.
*G06Q 30/00* (2023.01)
*H04M 3/51* (2006.01)
(Continued)

(52) U.S. Cl.
CPC ..... *G06Q 30/016* (2013.01); *G06F 16/24575* (2019.01); *G10L 15/26* (2013.01); *H04M 3/5183* (2013.01)

(58) Field of Classification Search
CPC ........... G06Q 30/016; G06F 16/24575; G10L 15/265; G10L 15/26; H04M 3/5183; H04M 2203/402; H04M 3/5133
See application file for complete search history.

(56) References Cited

U.S. PATENT DOCUMENTS 6,889,222 B1 * 5/2005 Zhao .................... G06F 16/9535
9,092,802 B1 * 7/2015 Akella .................... G06F 16/36
(Continued)

FOREIGN PATENT DOCUMENTS

WO WO-02056196 A2 * 7/2002 ......... G06F 17/2229
WO WO-2005103883 A1 * 11/2005 ....... G06F 17/30528
(Continued)

OTHER PUBLICATIONS

Monhammad Nuruzzaman, "A Survey on Chatbot Implementation in Customer Service Industry through Deep Neural Networks", 2018, IEEE 15th International Conference on E-Business Engineering (ICEBE), pp. 54-61. (Year: 2018).*
(Continued)

*Primary Examiner* — Tan D Nguyen
(74) *Attorney, Agent, or Firm* — Perkins Coie LLP

(57) ABSTRACT

A system for providing resource material to a customer service representative [CSR], including a database storing a plurality of resources associated with one or more customer service contexts, a memory storing instructions, and one or more processors configured to execute the instructions to analyze an on-going communication including a customer service request received from a customer; determine a context of the request based on the analysis and historical data associated with the customer determined to be associated with the communication, automatically identify, based on the context of the request, a resource in the database associated with the determined context; and display, via a user interface in real-time during the communication, the resource associated with the customer service request.

20 Claims, 7 Drawing Sheets

(51) Int. Cl.
  *G06F 16/2457* (2019.01)
  *G10L 15/26* (2006.01)
  *G06Q 30/016* (2023.01)

(56) References Cited

U.S. PATENT DOCUMENTS 9,311,670 B2 *  4/2016  Hoffberg ............... H04W 4/029
2013/0285855 A1 * 10/2013  Dupray ................. H04W 4/029
                                                      342/451

FOREIGN PATENT DOCUMENTS

WO    WO-2013158839 A1 * 10/2013  ........... G06F 40/289
WO    WO-2013160720 A1 * 10/2013  ............ G06Q 10/00
WO    WO-2017063092 A1 *  4/2017  ....... G06F 17/30327

OTHER PUBLICATIONS

Ivan Tyrin, "Multi-Agent System "Smart Factory" for Real-time Workshop Management: Results of Design & Implementation for Izhevsk Axion-Holding Factory", 2012, IEEE, pp. 1-4. (Year: 2012).*
Pattie Maes, "Agents that buy and sell,", 1999, The ACM digital libraries, vol. 42, No. 3, pp. 81-91. (Year: 1999).*

* cited by examiner

SYSTEMS AND METHODS FOR CUSTOMER SERVICE PREDICTION

CROSS-REFERENCE TO RELATED APPLICATIONS

This application is a continuation of U.S. patent application Ser. No. 16/112,625 filed Aug. 24, 2018, which is incorporated by reference in the present application.

BACKGROUND

A common pitfall of customer service is high customer service agent turnover. Training customer service agents is both expensive and time consuming, and agents may not remember all of the training materials they are exposed to, leading to longer call times and decreased customer satisfaction. Further, customer service agents may not be familiar with smaller concepts or projects at a large enterprise. The above factors may result in lower sales volume, fewer new customers, or fewer retained customers.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Disclosed embodiments include a system for providing resource material to a customer service representative (CSR). The system may include: a database storing a plurality of resources associated with a plurality of customer service contexts; one or more memories storing instructions; and one or more processors configured to execute the instructions to perform operations. The operations may include: receiving data associated with an on-going communication, the on-going communication comprising a customer service request received from a customer; analyzing the data associated with the on-going communication; determining an identity of the customer associated with the communication; determining a context of the request based on the analysis and based on historical data associated with the determined identity; automatically identifying, based on the context, a resource in the database associated with the determined context; and displaying, via a user interface in real-time during the communication, the resource associated with the customer service request.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes advanced technical solutions for predicting customer service requests, solutions, and resolution resources. As used herein, "customer service request" will refer to any customer inquiry or problem requiring assistance. For example, a customer service request may be troubleshooting an app or website; requesting account modifications, such as an address change, billing assistance; and the like. The prediction of a customer service solution in response to a customer service request or based on recent customer activity may result in increased customer satisfaction and retention by decreasing the time to resolve an issue or an inquiry from the customer.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
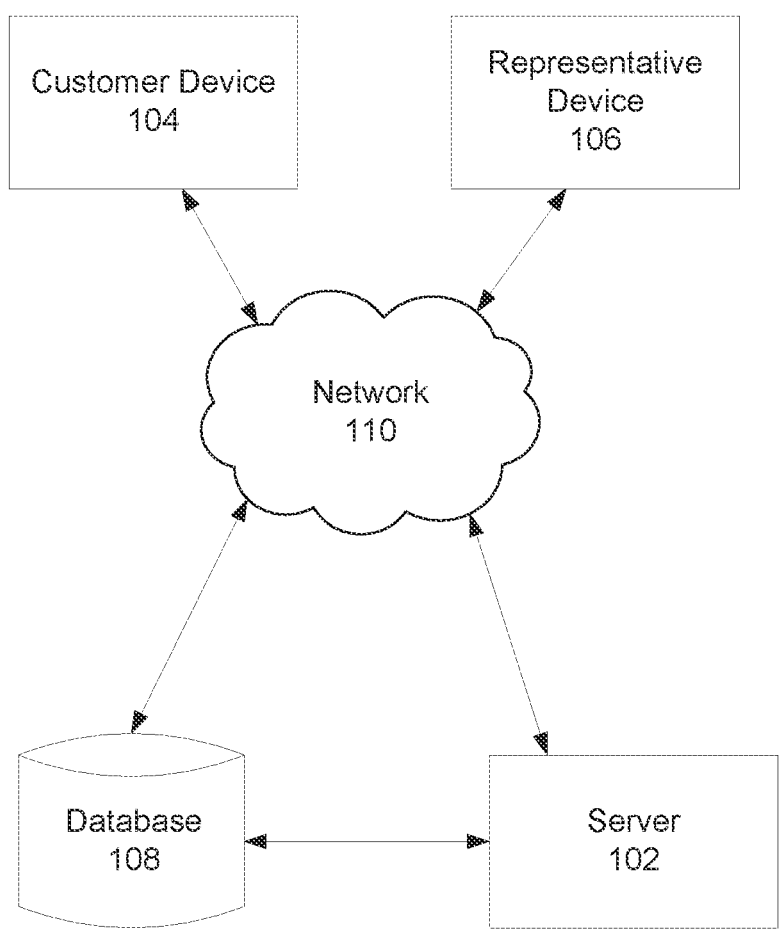
FIG. 1 depicts an example of a system environment for generating customer service prediction resources, consistent with the disclosed embodiments.

FIG. 1 is a diagram of a computer system 100 that may be configured to perform one or more software processes that, when executed by one or more processors, perform methods consistent with disclosed embodiments. The components and arrangements shown in FIG. 1 are not intended to limit the disclosed embodiments, as the components used to implement the disclosed processes and features may vary.

As shown in FIG. 1, system 100 may include a server 102, a customer device 104, a representative device 106, and a database 108. The components of system 100 may communicate directly, through network 110. Other components known to one of ordinary skill in the art may be included in system 100 to perform tasks consistent with the disclosed embodiments.

Server 102 may enable communication within external computer-based systems including computer system components such as desktop computers, workstations, tablets, hand held computing devices, memory devices, and/or internal network(s) connecting the components.

Customer device 104 may be a personal computing device such as, for example, a general purpose or notebook computer, a mobile device with computing ability, a tablet, a smartphone, a wearable device, or smart watch, or any combination of these computers and/or affiliated components. In some embodiments, customer device 104 may be a computer system or mobile computer device that is operated by the customer. In some embodiments, customer device 104 may be a kiosk or automated teller machine (ATM). In some embodiments, customer device 104 may be a landline telephone or device capable of receiving audio commands or commands via the telephone or device keypad.

In some embodiments, representative device 106 may be a device that is operated by a customer service specialist, representative, or other employee of a business entity. Representative device 106 may be a personal computing device such as, for example, a general purpose or notebook computer, a mobile device with computing ability, a tablet, smartphone, a wearable device, or smart watch, or any combination of these computers and/or affiliated components. In some embodiments, representative device 106 may be a landline telephone or device capable of receiving audio commands or commands via the telephone or device keypad.

Network 110 may comprise any type of computer networking arrangement used to exchange data. For example, network 110 may be the Internet, a private data network, virtual private network using a public network, and/or other suitable connection(s) that enables system 100 to send and receive information between the components of system 100. Network 110 may also include a public switched telephone network ("PSTN") and/or a wireless cellular network.

Figure 2:
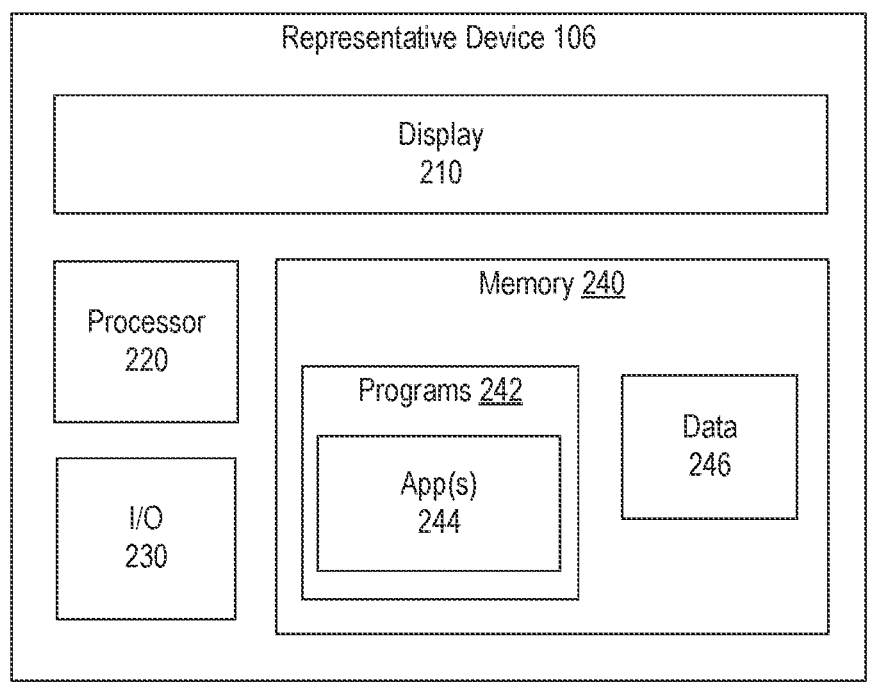
FIG. 2 depicts an example of a customer device, consistent with the disclosed embodiments.

FIG. 2 is a diagram of a representative device 106, consistent with disclosed embodiments. As shown, representative device 106 may include a display 210, one or more processors 220, one or more input/output ("I/O") devices 230, a transceiver 240 memory 250, and battery 270.

Display 210 may include one or more screens such as, for example, liquid crystal display (LCD), plasma, cathode ray tube (CRT), or projected screens. Display may display information such as customer service resources, customer data, and solution information.

Processor 220 may be one or more known processing devices, such as microprocessors manufactured by Intel™ or AMD™ or licensed by ARM. Processor 220 may constitute a single-core or multiple-core processor that executes parallel processes simultaneously. For example, processor 220 may be a single-core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc. In another embodiment, processor 220 may include a multiple-core processor arrangement (e.g., dual, quad core, etc.) configured to provide parallel processing functionalities to allow representative device 106 to execute multiple processes simultaneously. One of ordinary skill in the art would understand that other types of processor arrangements could be implemented that provide for the capabilities disclosed herein.

I/O devices 230 may include one or more devices that allow representative device 106 to receive input from a customer service representative or other user. I/O devices 230 may include, for example, one or more pointing devices, keyboards, buttons, switches, touchscreen panels, cameras, barcode scanners, radio frequency identification (RFID) tag reader, and/or microphones.

Memory 240 may include a volatile or non-volatile, magnetic, semiconductor, solid-state, tape, optical, removable, non-removable, or other type of storage device or tangible (i.e., non-transitory) computer-readable medium that stores one or more program(s) 242, such as app(s) 244, and data 246. Data 246 may include, for example, customer account information, recent customer activity, predicted customer service solutions, and/or relevant customer service resources.

Program(s) 242 may include operating systems (not shown) that perform known operating system functions when executed by one or more processors. By way of example, the operating systems may include Microsoft Windows™, Unix™, Linux™ Android™ and Apple™ operating systems, Personal Digital Assistant (PDA) type operating systems, such as Microsoft CE™, or other types of operating systems. Accordingly, disclosed embodiments may operate and function with computer systems running any type of operating system. Representative device 106 may also include communication software that, when executed by a processor, provides communications with network 110, such as Web browser software, tablet, or smart hand held device networking software, etc.

Program(s) 242 may also include app(s) 244, such as an interactive voice response (IVR) and/or touch-tone data entry (TDE) program which, when executed, gather initial information from a customer about a customer service request. For example, a customer making a customer service request via land-line telephone may be prompted to navigate through an automated menu and to provide details such as the nature of their request and/or their account number by speaking into the telephone or through by various numbers on the keypad.

Figure 3:
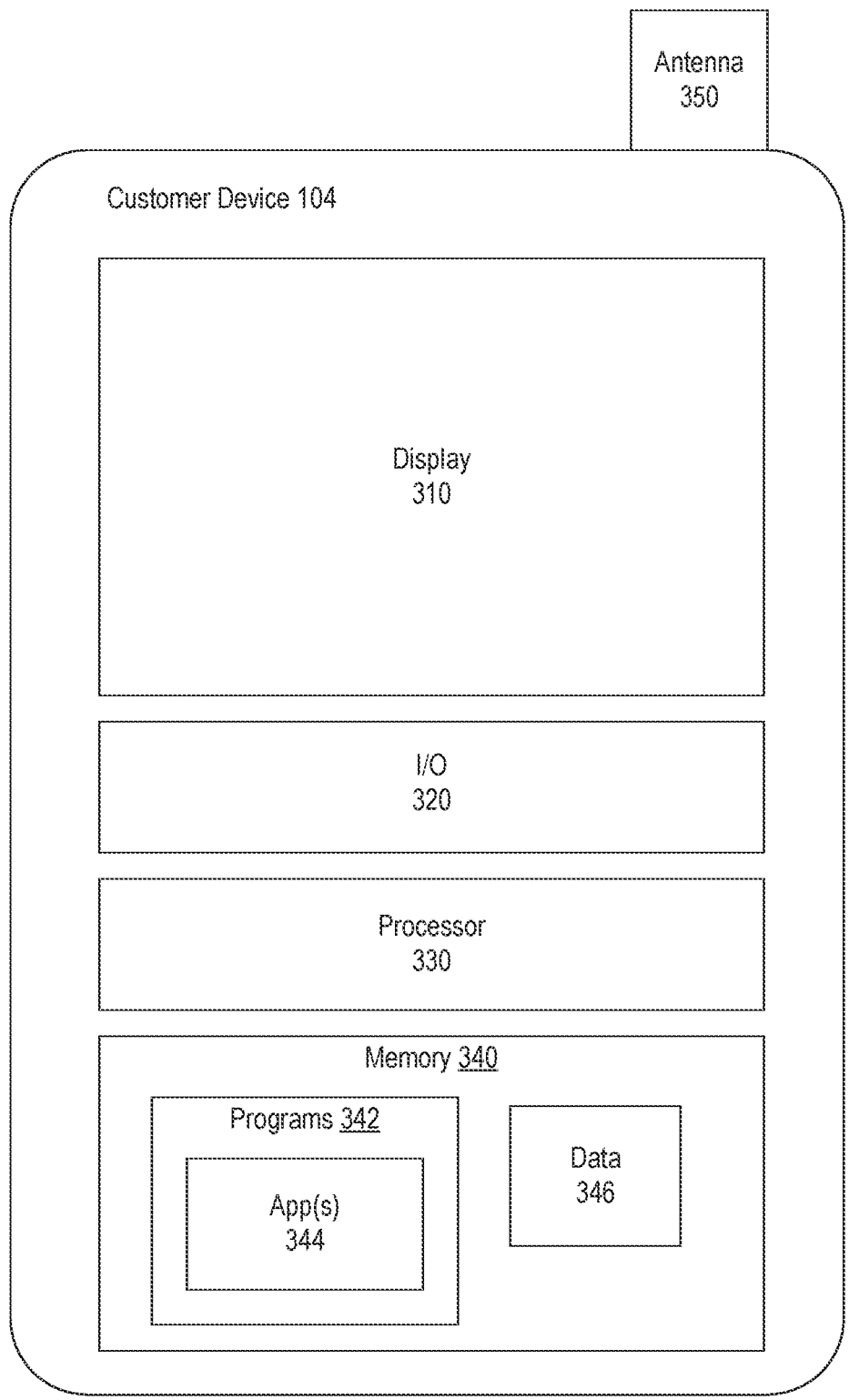
FIG. 3 depicts an example of a device used by a customer service representative, consistent with the disclosed embodiments.

FIG. 3 shows a diagram of an exemplary customer device 104, consistent with disclosed embodiments. As shown, customer device 104 may include a display 310, I/O device(s) 320, a processor 330, a memory 340 having stored thereon data 346 and one or more programs 342, such as app(s) 344 (e.g., a financial services app), and an antenna 350.

Display 310 may include one or more devices for displaying information, including but not limited to, liquid crystal displays (LCD), light emitting diode (LED) screens, organic light emitting diode (OLED) screens, and other known display devices.

I/O devices 320 may include one or more devices that allow customer device 104 to send and receive information. I/O devices 320 may include, for example, a pointing device, keyboard, buttons, switches, microphones, and/or a touchscreen panel. I/O devices 320 may also include one or more communication modules (not shown) for sending and receiving information from other components in system 100 by, for example, establishing wired or wireless connectivity (via antenna 350) between customer device 104 to network 110, or by establishing direct wired or wireless connections between customer device 104 and other components of system 100. Direct connections may include, for example, Bluetooth™, Bluetooth LE™, WiFi, near field communications (NFC), or other known communication methods which provide a medium for transmitting data between separate devices.

Processor(s) 330 may be one or more known computing devices, such as those described with respect to processor 220 in FIG. 2.

Memory 340 may be a volatile or non-volatile, magnetic, semiconductor, tape, optical, removable, non-removable, or other type of storage device or tangible (i.e., non-transitory) computer-readable medium such as those described with respect to memory 240 in FIG. 2.

Figure 4:
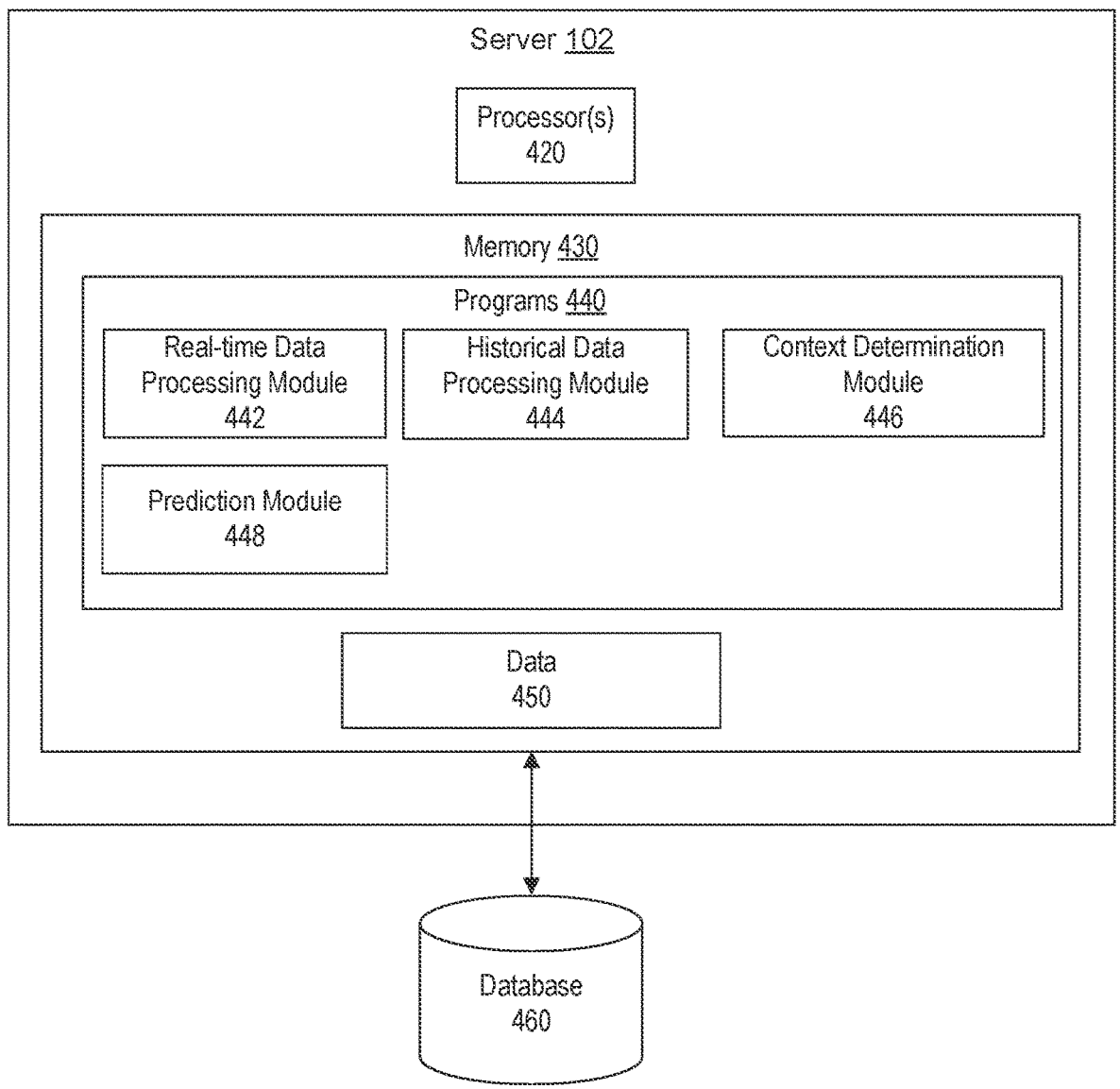
FIG. 4 shows a diagram of an exemplary facility server, consistent with the disclosed embodiments.

FIG. 4 shows a diagram of an exemplary facility server 130, consistent with disclosed embodiments. In some embodiments, facility server 130 may be a local server within facility system 102. In such embodiments, facility server 130 may include one or more distributed computer systems capable of performing distributed computing functions, cloud computing services and functions, and interface-related functions consistent with disclosed embodiments. In some embodiments, facility server 130 may operate in conjunction with network server 130. In other embodiments, network server 160 may operate alone, and facility server 130 may be replaced by a network connection to network 150 and/or local network 110. In such embodiments, network server 160 may perform all functions associated with the disclosed methods. In other embodiments, facility server 130 may operate alone, without network server 160. In such embodiments, facility system 102 may operate as a standalone system, in which facility server 130 performs all functions associated with the disclosed methods. Those of ordinary skill in the art will appreciate that the computing arrangements are not limited to these examples, and that other embodiments may include one or more alternate configurations of computing systems capable of performing functions associated with the disclosed embodiments.

In some embodiments, facility server 130 may connect to multiple facilities located in different geographical locations. In such embodiments, facility server 160 may collect data from multiple facilities to evaluate performance times in different facilities, improve the accuracy of expected completion times for different types of tasks using one or more statistical/data regression algorithms, and predict future utilization of one or more of the facilities.

As shown in FIG. 4, server 102 may include one or more processor(s) 420, one or more memories storing programs 440 (including, for example, a real-time data processing module 442, a historical data processing module 444, a context determination module 446, and/or a prediction module 448), data 450, and an internal database 460. Server 102 may be a single server or may be configured as a distributed computer system including multiple servers or computers that interoperate to perform one or more of the processes and functionalities associated with the disclosed embodiments.

Processor(s) 420 may be one or more known computing devices, such as those described with respect to processor 220 in FIG. 2.

In some embodiments, server 102 may include one or more storage devices configured to store information used by processor 420 (or other components) to perform certain functions related to the disclosed embodiments. In one example, server 102 may include memory 430 that includes instructions to enable processor 420 to perform operations by executing one or more applications, such as server applications, an electronic transaction application, an account status application, network communication processes, and any other type of application or software known to be available on computer systems. Alternatively or additionally, the instructions, application programs, etc. may be stored in internal database 460 or external database 108 (shown in FIG. 1) in communication with server 102, such as one or more databases or memories accessible over network 110. Database 460 or external storage may be a volatile or non-volatile, magnetic, semiconductor, tape, optical, removable, non-removable, or other type of storage device or tangible (i.e., non-transitory) computer-readable medium.

In one embodiment, server 102 may include memory 430 that includes instructions that, when executed by processor 420, perform one or more processes consistent with the functionalities disclosed herein. Methods, systems, and articles of manufacture consistent with disclosed embodiments are not limited to separate programs or computers configured to perform dedicated tasks. For example, server 102 may include memory 430 that may include one or more programs 440 to perform one or more functions of the disclosed embodiments. Moreover, processor 420 may execute one or more programs located remotely from system 100. For example, server 102 may access one or more remote programs, that, when executed, perform functions related to disclosed embodiments.

Programs 440 stored in memory 430 and executed by processor(s) 420 may include one or more of a real-time data processing module 442, a historical data processing module 444, a context determination module 446, and a prediction module 448. Real-time data processing module 442 may gather, analyze, and transmit data collected in real-time during a customer service request. Real-time data may include (IVR) data or a natural language translation of a customer telephone interaction with a customer service representative. Real-time data may also include text input, via a customer service interface or web chat, from the customer and/or customer service agent. Real-time data may include data such as a category of the customer service request (e.g., troubleshooting, account information, other inquiries, etc.), a customer account number, and/or data directly input by the representative via a customer service interface.

Historical data processing module 444 may gather, analyze, and/or transmit historical data stored on database 108. Historical data may refer to data associated with a particular customer or account of the customer making the request, or may refer to global customer service data. Historical data may include statistical data on customer service requests and request outcomes (e.g., if a similar request was resolved and how the request was resolved). For example, historical data may include a ranking, input by a customer via an interface, indicating to what degree a customer service representative successfully resolved the customer's customer service request. Historical data may also include data collected for a specific customer indicating the customer's past account actions or activities (e.g., web site sign-on's, withdrawals, deposits, transfers, etc.). In some embodiments, historical data may refer to data from one or more customers or a subset of customers. In some embodiments, historical data may refer to data from one specific customer.

Context determination module 446 may receive data from the real-time data processing module 442 and the historical data processing module 444. The context determination module 446 may use data to determine the context of a customer service request. For example, if a customer calls an entity's customer service helpline and navigates through an automated menu by selecting a help category such as "Website Troubleshooting," IVR or keypad data received from the customer to make the selection may be received by the context determination module 446 from the real-time data processing module 442. Context determination module 446 may use this data along with speech-to-text data from the customer's telephone conversation with the representative to identify one or more keywords associated with the customer's problem or request. Context determination module 446 may compile a list of keywords or phrases describing the problem presented by the customer. The context determination module 446 may also use historical data, such as prior account activity by the customer or previous, similar customer requests that have been successfully resolved.

Prediction module 448 may receive data indicating the context of a customer service request from the context determination module 446. Based on the received context data, historical data, and real-time data, the prediction module 448 may generate a prediction, in real-time, of how to resolve the customer service request. Prediction module 448 may use the keywords or phrases generated by the context module 446 to query a database (e.g., database 108 or 460) for problems and resolutions and/or reference materials associated with the generated context. For example, if the context is determined to be a technical problem with a mobile application, the prediction module 448 may generate a list of resources for troubleshooting the application. This list may be displayed to a customer using an ATM or kiosk, may be displayed to a customer via a graphical user interface on a customer device 104, or may be displayed via graphical user interface on a representative device 106 to a representative assisting a customer via telephone or web chat.

In some embodiments, prediction module 448 may predict future servicing needs of the customer based on the determined context and customer account activity. For example, the context determination module 446 may determine that a customer has attempted to transfer funds between accounts and visited the website help page. In this example, prediction module 448 may generate a prediction that the customer is having trouble completing a balance transfer and identify appropriate resources to assist the customer service representative in troubleshooting the issue with the customer. Prediction module 448 may also predict sales opportunities. For example, if the customer consistently pays off the balance of a credit card with a low limit, prediction module 448 may identify credit cards with higher limits or rewards programs to offer to the customer.

In some embodiments, memory 430 may store data 450 including data associated with customer service resources, common customer service requests, historical data, data derived from historical data such as trends, patterns, and correlative relationships.

In some embodiments, memory 430 and database 460 may include one or more memory devices that store data and instructions used to perform one or more features of the disclosed embodiments. Memory 430 and database 460 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Figure 5:
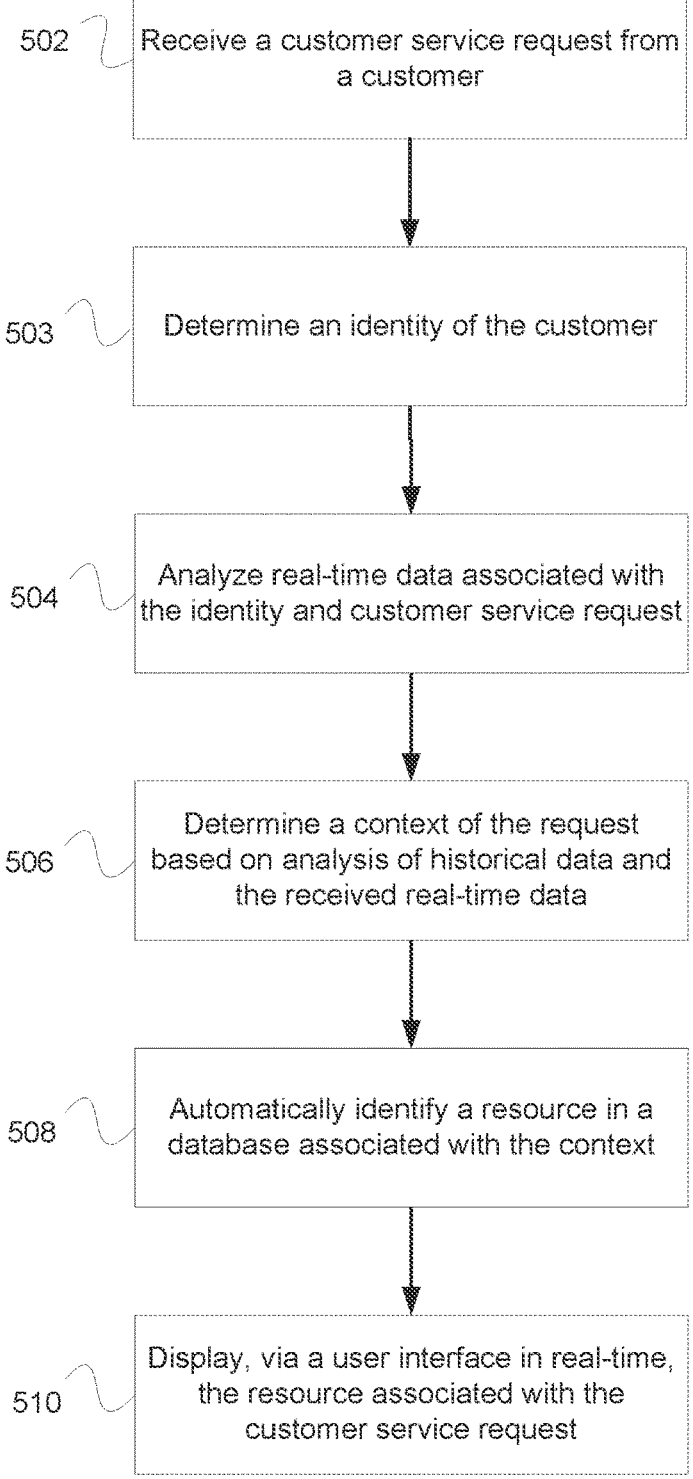
FIG. 5 is a flowchart of an exemplary prediction process, consistent with the disclosed embodiments.

FIG. 5 is a flowchart of an exemplary prediction process 500. In some embodiments, prediction process 500 may generate and display resources for resolving a customer service request. In another embodiment, prediction process 500 may produce one or more graphical user interfaces or other resources for guiding a customer service representative during a sales call, to offer one or more relevant products to a customer based on the customer's historical data. Process 500 is discussed below as being performed by a server, e.g., server 102.

In step 502, data associated with a customer service request may be received from a customer during a communication with a customer service representative, e.g., a web chat and/or telephone call. In some embodiments, a customer service request may be received via a user interface on a mobile application, at a kiosk, and/or at an ATM. Data associated with the request may include one or more of audio data, text data, interactive voice response data, and the like. For example, the system 100 may receive IVR data, data input in real-time by a customer service agent indicating the nature of the request, or real-time audio data received via a customer's telephone conversation with a customer service agent. Real-time data may also include data received via a user interface.

In some embodiments, for example, if the customer service interaction occurs via telephone, at step 503, the system may determine an identity of the customer. The identity of the customer may, for example, be an account number, name, security code, or the like, associating the customer to an existing account. In some embodiments, the system may use the identity to request historical data from one or more databases. The system may determine the identity of the customer based on, for example, the parsed audio or text data received during the customer service interaction.

In step 504, system 100 may analyze the data associated with the customer initiating the customer service request. In some embodiments, system 100 may receive raw data from one or more networked sources, and clean and/or normalize the data. In some embodiments, audio data may be received and transcribed, e.g., using NLP or other known audio data processing techniques to generate textual data from received audio data.

In some embodiments, for example, the system may use an algorithm, natural language processing (NLP) software, or other method known to one of skill in the art to parse the data and to determine, for example, one or more features of the data. Features may include, for example, call duration, common customer inquiries, keywords received as part of the request, and the like. For example, the system may analyze audio data using NLP and identifying keywords such as, for example, "transfer," "international," and/or "website."

In step 506, a context of the customer service request may be determined, for example, by context determination module 446, based on the analyzed data and/or on historical data collected prior to the customer service request. For example, real-time data may include the selection of an "Account Help" option by a customer via an automated telephone menu, and historical data for the customer may indicate that the customer has tried to log-in to a mobile application unsuccessfully during the past 24 hours. In this scenario, the context may be determined to be "Account Log-in Help." System 100 may use one or more of a machine learning process or neural network to determine a context. For example, classification techniques may be used to classify one or more characteristics associated with the context. In some embodiments, at least one context may be identified using a neural network trained, using a machine learning system, using a pattern recognition system, and so forth. The system 100 may also have a machine analysis algorithm incorporated such that a library of known contexts may be updated each time a customer contacts a customer service representative. A person of ordinary skill in the art will recognize other methods for identifying one or more contexts based on received data that remain consistent with the present disclosure.

In some embodiments, system 100 may determine a context using word recognition to identify words and/or phrases associated with one or more contexts. In another embodiment, system 100 may pass one or more audio transcriptions to a neural network to identify one or more contexts. In addition, a neural network may determine a probability of a context based on received input data, and/or may determine a proximity of the context. In another embodiment, a convolutional neural network may receive audio data to determine customer tone. Customer tone may be used to identify resources to display to the customer service, such as de-escalation techniques, sales offers, and/or a prompt to contact a senior representative or manager. The system may combine information received as audio input with historical account information. For example, a customer request received over the telephone may include the phase "transfer." If system 100 determines that historical customer data indicates that the customer recently set up a new account, system 100 may determine the context to be that the customer wishes to transfer funds to the new account. Historical data may indicate that the customer has previously made several transfers to another customer's account, and thus, the combination of audio and historical data may indicate that the context is that the customer is attempting to transfer funds to another person's account.

In step 508, the prediction module 448 may identify resources in a database associated with the context of the customer service request. For example, resources may include a guide detailing how the customer may reset their password or steps to take to authenticate the customer if an unauthorized user is attempting to access the account. The prediction may be based on resources that have yielded resolutions for customers with similar request based on the generated context of the request. Resources may be retrieved from a remote database or cloud system. In some embodiments, the types of retrieved resources may depend on the type of customer service request detected. For example, if a request is received via a kiosk, the resource may include displayed instructions targeted toward a customer. In another example, if the request is received via telephone, e.g., from a customer directly interacting with a customer service agent, the resources may be internal documents targeted towards a customer service representative.

In some embodiments, prediction module 448 may identify one or more resources based on results of previous customer interactions. In some embodiments, results of previous interactions may be calculated based on an individual customer. In other embodiments, predictions may be made based on customer data aggregated based on one or more customer characteristics, e.g., demographic information, account balance, late payment history, number of financial services used, etc. Predicted resources may include, for example, information about an incentive program or white glove treatment. For example, if a customer's historical data correlates to a future context of closing an account, a predicted resource may be one or more incentive programs. In some embodiments, incentive programs may be ranked based on the probability of a positive outcome, e.g., how likely it is that the incentive will prevent the customer from closing the account.

In step 510, the resources identified by prediction module 448 may be displayed to the customer or customer service representative via a user interface. In some embodiments, the resources are displayed on a customer device 104 such as, for example, a mobile device, kiosk, ATM, or computing device. In some embodiments, the resources may be displayed to a customer service representative, via a user interface, in real-time during a customer service communication.

Figure 6:
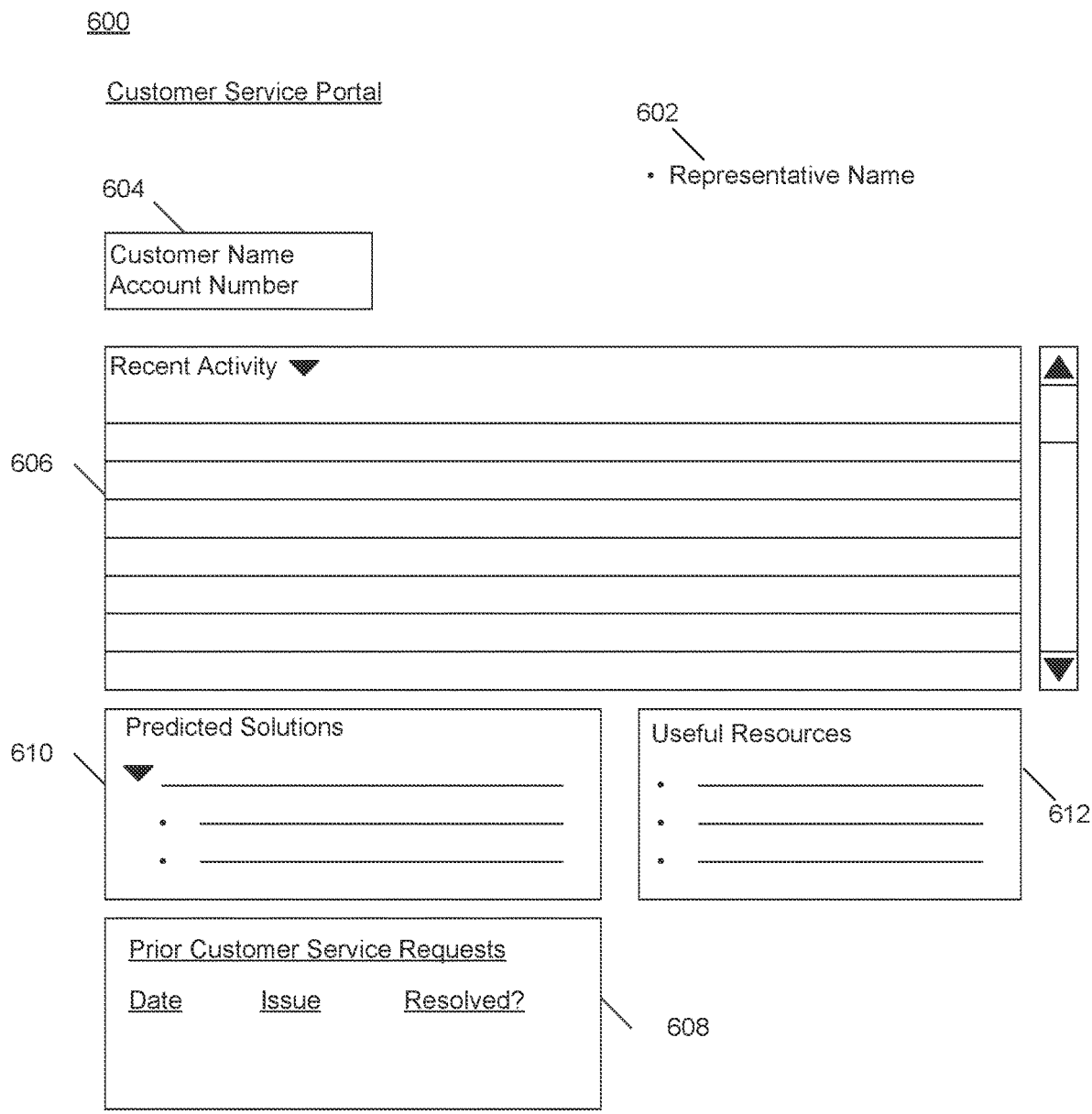
FIG. 6 is an exemplary customer service portal, consistent with the disclosed embodiments.

FIG. 6 is an exemplary customer service portal 600. Customer service portal 600 may be accessed by a customer service representative in real-time on a device, e.g., representative device 106, connected to network 110. Customer service portal 600 may display information including the customer service representative name 602, the customer name and account number 604, and recent customer activity 606. Customer service portal 600 may also display previous customer service requests 608 from the same customer. In some embodiments, customer service portal 600 may display predicted solutions 610 and useful resources 612 based on the output from prediction module 448. Predicted solutions may include steps to take to resolve the customer request or contact information of representatives able to solve the customer's request. Useful resources may include customer service representative training materials, troubleshooting guides, and/or specific product information. Information displayed on customer service portal 600 may better help the customer service representative to assist the customer by providing links to resources or guides that the representative may be unfamiliar with or may have forgotten since training. Customer service portal 600 may update in real-time with predicted solutions as more data is received from the customer or representative.

Figure 7:
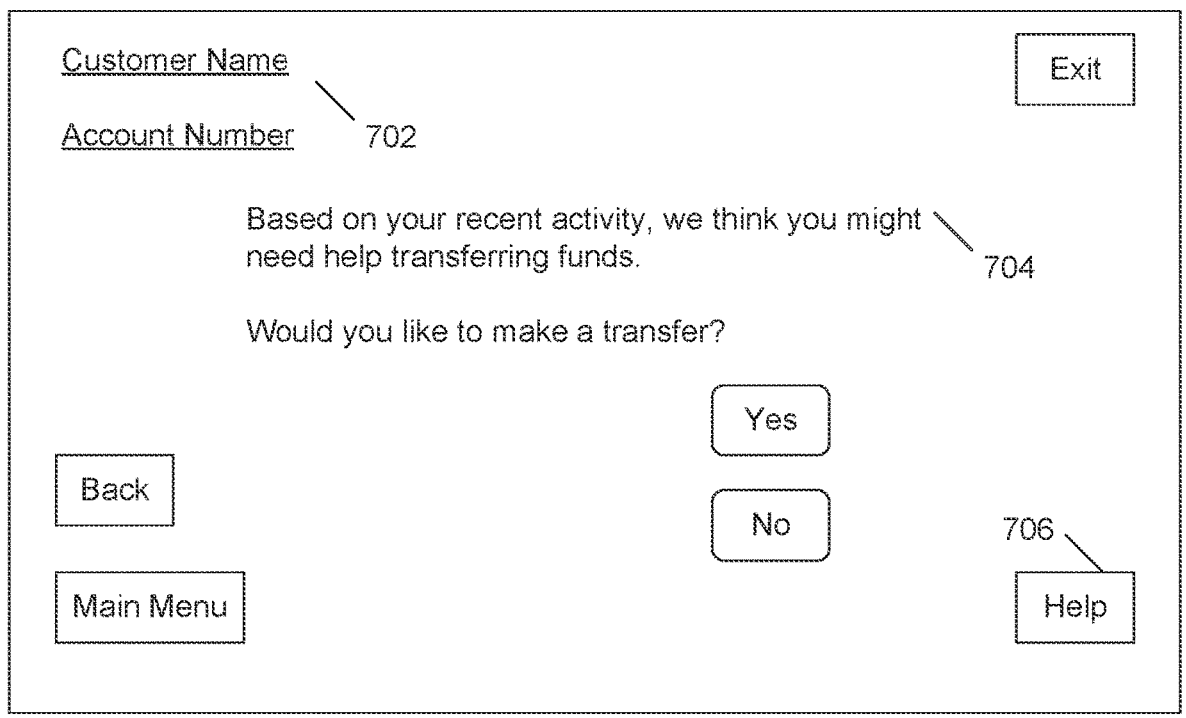
FIG. 7 is an exemplary customer interface, consistent with the disclosed embodiments.

FIG. 7 is an exemplary customer interface 700. Customer interface 700 may be displayed on a mobile device, kiosk, or ATM. Customer interface 700 may require a customer to sign into their account by providing details such as a password, personal identification number, or credit/debit card. Customer interface 700 may display the customer name and account number 702 associated with the customer. Customer interface 700 may display a prompt 704, based on detected customer activity via an app, website, or directly at a kiosk, asking if the customer is trying to complete a specific action, e.g., make a transfer, make a deposit, check an account balance, etc. Customer interface 700 may also display a help button 706 to connect the customer with a customer service representative or to receive further input from the customer regarding their request.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of operations may be modified, and operations may be added or deleted. For example, in some embodiments, some of the steps may be performed as parallel operations. Other modifications are also contemplated.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language used in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

The invention claimed is:
1. A method for providing resource materials, the method comprising:
receiving real-time data, wherein the real-time data is generated based on customer input indicative of a service request from a customer;

identifying historical activity data of the customer, wherein the historical activity data includes past activity data associated with the customer;

receiving communication data associated with an on-going communication, the communication data comprising at least one of text or audio received from a customer device operated by the customer;

determining, based on the communication data and the historical activity data using a machine-learning model implementing a neural network, a context of the communication data;

automatically identifying, based on the context, one or more resources associated with the context;

determining whether the service request is received from a kiosk or a user device;

based on determining that the service request is received from the kiosk, identifying, within the one or more resources, a first resource comprising one or more instructions to be displayed for the customer and generating for display the first resource; and based on determining that the service request is received from the user device, identifying, within the one or more resources, a second resource targeted to a customer service agent and generating for display the second resource.

2. The method of claim 1, wherein the on-going communication is at least one of an on-line chat or a telephonic conversation.

3. The method of claim 1, wherein the communication data comprises a request received from a computing device associated with the customer.

4. The method of claim 1, wherein receiving the communication data comprises receiving the communication data as part of a user action to access information stored on a computing device.

5. The method of claim 1, wherein the communication data comprises at least one of a verbal request or a written request.

6. The method of claim 1, further comprising parsing the communication data for a plurality of key words.

7. The method of claim 6, wherein parsing the communication data comprises analyzing real-time audio data.

8. The method of claim 1, wherein determining that the service request originated via the user device comprises determining that the service request originated via a telephone.

9. A non-transitory computer-readable medium storing instructions which when executed cause one or more processors to perform a method for providing resource material, the method comprising:

receiving real-time data, wherein the real-time data is generated based on customer input indicative of a service request from a customer;

identifying historical activity data of the customer, wherein the historical activity data includes past activity data associated with the customer;

receiving communication data associated with an on-going communication, the communication data comprising at least one of text or audio received from a customer device operated by the customer;

determining, based on the communication data and the historical activity data using a machine-learning model implementing a neural network, a context of the communication data;

automatically identifying, based on the context, one or more resources associated with the context;

determining whether the service request is received from a kiosk or a user device;

based on determining that the service request is received from the kiosk, identifying, within the one or more resources, a first resource comprising one or more instructions to be displayed for the customer and generating for display the first resource; and based on determining that the service request is received from the user device, identifying, within the one or more resources, a second resource targeted to a customer service agent and generating for display the second resource.

10. The non-transitory computer-readable medium of claim 9, wherein the on-going communication is at least one of an on-line chat or a telephonic conversation.

11. The non-transitory computer-readable medium of claim 9, wherein the communication data comprises a request received from a computing device associated with the customer.

12. The non-transitory computer-readable medium of claim 9, wherein the instructions for receiving the communication data cause the one or more processors to receive the communication data as part of a user action to access information stored on a computing device.

13. A system for providing resource materials, the system comprising:
 a user device;
 a kiosk; and
 a server comprising:
  one or more processors; and
  a non-transitory computer-readable storage medium storing instructions, which when executed by the one or more processors cause the one or more processors to perform operations comprising:
   receiving real-time data, wherein the real-time data is generated based on customer input indicative of a service request from a customer;
   identifying historical activity data of the customer, wherein the historical activity data includes past activity data associated with the customer;
   receiving communication data associated with an on-going communication, the communication data comprising at least one of text or audio received from a customer device operated by the customer;
   determining, based on the communication data and the historical activity data using a machine-learning model implementing a neural network, a context of the communication data;
   automatically identifying, based on the context, one or more resources associated with the context;
   based on determining that the service request originated from the kiosk, identifying, within the one or more resources, a first resource comprising one or more instructions to be displayed for the customer and generating for display the first resource; and
   based on determining that the service request originated via the user device, identifying, within the one or more resources, a second resource targeted to a customer service agent and generating for display the second resource.

14. The system of claim 13, wherein the on-going communication is at least one of an on-line chat or a telephonic conversation.

15. The system of claim 13, wherein the communication data comprises a request received from a computing device associated with the customer.

16. The system of claim 13, wherein receiving the communication data comprises receiving the communication data as part of a user action to access information stored on a computing device.

17. The system of claim 13, wherein the communication data comprises at least one of a verbal request or a written request.

18. The system of claim 13, further comprising parsing the communication data for a plurality of key words.

19. The system of claim 13, wherein parsing the communication data comprises analyzing real-time audio data.

20. The system of claim 13, wherein determining that the service request originated via the user device comprises determining that the service request originated via a telephone.

* * * * *